(12) United States Patent
Shi et al.

(10) Patent No.: US 10,863,312 B2
(45) Date of Patent: Dec. 8, 2020

(54) MOVING TRACK SHARING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Xiao Shi, Shenzhen (CN); Qian Wang, Shenzhen (CN); Renhua Du, Shenzhen (CN); Xiangdong Zhu, Shenzhen (CN); Le Zhang, Shenzhen (CN); Qiqi Zhu, Shenzhen (CN); Wei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 262 days.

(21) Appl. No.: 15/925,343

(22) Filed: Mar. 19, 2018

(65) Prior Publication Data

US 2018/0209807 A1 Jul. 26, 2018

Related U.S. Application Data

(63) Continuation of application No. PCT/CN2017/071287, filed on Jan. 16, 2017.

(30) Foreign Application Priority Data

Jan. 18, 2016 (CN) .......................... 2016 1 0032706

(51) Int. Cl.
*H04W 4/029* (2018.01)
*G01C 21/34* (2006.01)
*G01C 21/36* (2006.01)

(52) U.S. Cl.
CPC .................................. *H04W 4/029* (2018.02)

(58) Field of Classification Search
CPC ......... H04W 4/029; H04W 4/00; H04W 4/02; H04W 4/024; H04L 51/20; G01C 21/362; G01C 21/3492; G01C 21/3415
See application file for complete search history.

(56) References Cited

U.S. PATENT DOCUMENTS 8,825,087 B2 * 9/2014 Hamill ............... G06Q 30/0209
455/456.3
2009/0325603 A1 * 12/2009 Van Os .................. H04W 4/029
455/456.2

(Continued)

FOREIGN PATENT DOCUMENTS

CN 102857527 A 1/2013
CN 103955488 A 7/2014

(Continued)

OTHER PUBLICATIONS

The World Intellectual Property Organization (WIPO) International Search Report for PCT/CN2017/071287 dated Mar. 22, 2017 5 Pages (including translation).

(Continued)

*Primary Examiner* — Nga X Nguyen
(74) *Attorney, Agent, or Firm* — Anova Law Group, PLLC

(57) ABSTRACT

The present disclosure discloses a moving-track sharing method and apparatus, and a storage medium. The method includes: receiving, by an instant messaging client, a track-sharing instruction, wherein the track-sharing instruction is used to instruct the instant messaging client to share a real-time moving-track of a first terminal in a moving event, and the instant messaging client is located on the first terminal; generating, by the instant messaging client, a first track-sharing event in response to the track-sharing instruction; and sending, by the instant messaging client, the first track-sharing event to a server, wherein the first track- (Continued)

sharing event is used to instruct the server to share a real-time moving-track of the first terminal in a manner specified by the track-sharing instruction.

16 Claims, 6 Drawing Sheets

(56) References Cited

U.S. PATENT DOCUMENTS

| | | | |
|---|---|---|---|
| 2014/0012494 A1 | 1/2014 | Cudak et al. | |
| 2015/0229597 A1 | 8/2015 | Ruckart | |
| 2015/0330805 A1* | 11/2015 | Cho | G01C 21/3676 |
| | | | 701/428 |

FOREIGN PATENT DOCUMENTS

| | | | |
|---|---|---|---|
| CN | 104125282 A | 10/2014 |
| CN | 104344833 A | 2/2015 |
| CN | 104468847 A | 3/2015 |
| CN | 105139316 A | 12/2015 |

OTHER PUBLICATIONS

The State Intellectual Property Office of the People's Republic of China (SIPO) Office Action 1 for 201610032706.5 dated Jun. 25, 2019 11 Pages (including translation).

* cited by examiner under the track-sharing instruction; and sending the first track-sharing event to a server, wherein the first track-sharing event is used to instruct the server to share a real-time moving-track of the first terminal in a manner specified by the track-sharing instruction.

MOVING TRACK SHARING METHOD AND APPARATUS, AND STORAGE MEDIUM

RELATED APPLICATION

This application is a continuation application of PCT Patent Application No. PCT/CN2017/071287, filed on Jan. 16, 2017, which claims priority to Chinese Patent Application No. 201610032706.5, filed with the Chinese Patent Office on Jan. 18, 2016 and entitled "MOVING TRACK SHARING METHOD AND APPARATUS, AND STORAGE MEDIUM", which is incorporated herein by reference in its entirety.

FIELD OF THE TECHNOLOGY

The present disclosure relates to the field of the Internet and, specifically, to a moving track sharing method and apparatus, and a storage medium.

BACKGROUND

An existing user may share the location information with a chatting friend by using an application program installed on a terminal. However, only sharing the location cannot satisfy users' demand. For example, when one of the chatting friends needs to provide direction for other friends or to guide the driving route of other friends, and need to check the path information of other friends, the driving track of other friends. However, this function is often not implemented in the existing technology.

SUMMARY

Embodiments of the present invention provide a moving track sharing method and apparatus, and a storage medium, to resolve at least some aspects of the above technical problem that a friend's moving track cannot be shared by other friends with instant messaging.

According to an aspect of the embodiments of the present invention, a moving track sharing method is provided. The method includes: receiving, by an instant messaging client, a track-sharing instruction, wherein the track-sharing instruction is used to instruct the instant messaging client to share a real-time moving-track of a first terminal in a moving event, and the instant messaging client is located on the first terminal; generating, by the instant messaging client, a first track-sharing event in response to the track-sharing instruction; and sending, by the instant messaging client, the first track-sharing event to a server, wherein the first track-sharing event is used to instruct the server to share a real-time moving-track of the first terminal in a manner specified by the track-sharing instruction.

According to another aspect of the embodiments of the present invention, another moving track sharing method is provided. The method includes: receiving, by a server, a first track-sharing event sent by an instant messaging client, wherein the first track-sharing event carries a specified sharing manner; and sharing in the specified sharing manner, by the server, a real-time moving-track of a first terminal on which the instant messaging client is located.

According to another aspect of the embodiments of the present invention, a non-transitory computer-readable storage medium is provided. The non-transitory computer-readable storage medium contains computer-executable instructions for, when executed by one or more processors, performing a moving-track sharing method of an instant messaging client. The method includes: receiving a track-sharing instruction, wherein the track-sharing instruction is used to instruct the instant messaging client to share a real-time moving-track of a first terminal in a moving event, and the instant messaging client is located on the first terminal; generating a first track-sharing event in response to the track-sharing instruction; and sending the first track-sharing event to a server, wherein the first track-sharing event is used to instruct the server to share a real-time moving-track of the first terminal in a manner specified by the track-sharing instruction.

BRIEF DESCRIPTION OF THE DRAWINGS

The accompanying drawings described herein are used to provide further understanding about the present disclosure, and form a portion of this application. Schematic embodiments of the present invention and descriptions about the exemplary embodiments are used to explain the present disclosure, and do not constitute inappropriate limitation on the present disclosure. In the accompanying drawings.

DETAILED DESCRIPTION

Figure 1:
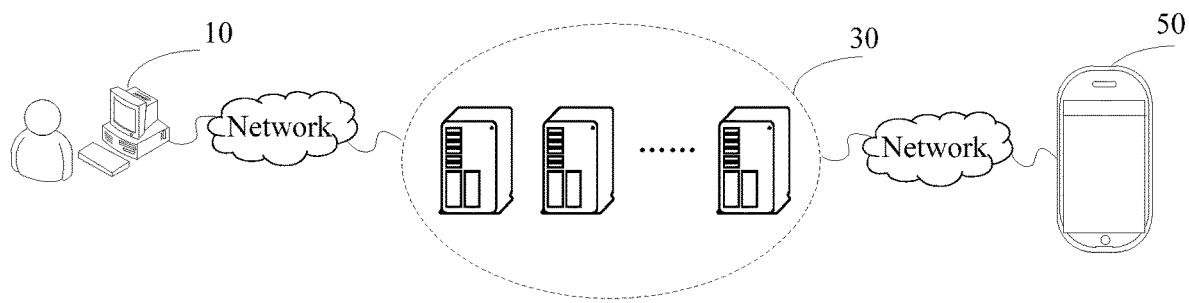
FIG. 1 illustrates a schematic diagram of a hardware environment according to an embodiment of the present invention.

To make a person skilled in the art better understand solutions in the present disclosure, the followings describe the technical solutions in the embodiments of the present invention with reference to the accompanying drawings. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

It should be noted that, the terms such as "first" and "second" in the specification and claims of the present disclosure and the accompanying drawings are used to distinguish similar objects, but are not necessarily used to describe a specific sequence or a precedence level. It should be understood that, data used in this way may be interchanged in a proper circumstance, so that the embodiments of the present invention described herein can be implemented in a sequence different from those shown in the drawings or described herein. In addition, terms "include" and "have" and any variation thereof are intended to cover nonexclusive including. For example, a process, method, system, product, or device including a series of steps or units are not limited to those clearly listed steps or units, but may include another step or unit that is not clearly listed or is inherent for the process, method, product or device.

According to an embodiment of the present invention, an embodiment of a moving-track sharing method is provided. It should be noted that, the steps shown in a flowchart of the accompanying drawing may be performed, for example, in a computer system with a group of computer executable instructions. In addition, although a logical sequence is shown in the flowchart, the shown or described steps may be performed in a sequence different from the sequence herein in some cases.

Optionally, in one embodiment, the moving-track sharing method may be applied to a hardware environment that is shown in FIG. 1 and that includes a first terminal 10, a server 30, and a second terminal 50. The hardware environment includes a network environment. As shown in FIG. 1, the terminal 10 is connected to the server 30 by using a network, and the network includes but is not limited to a wide area network, a metropolitan area network, or a local area network.

Figure 2:
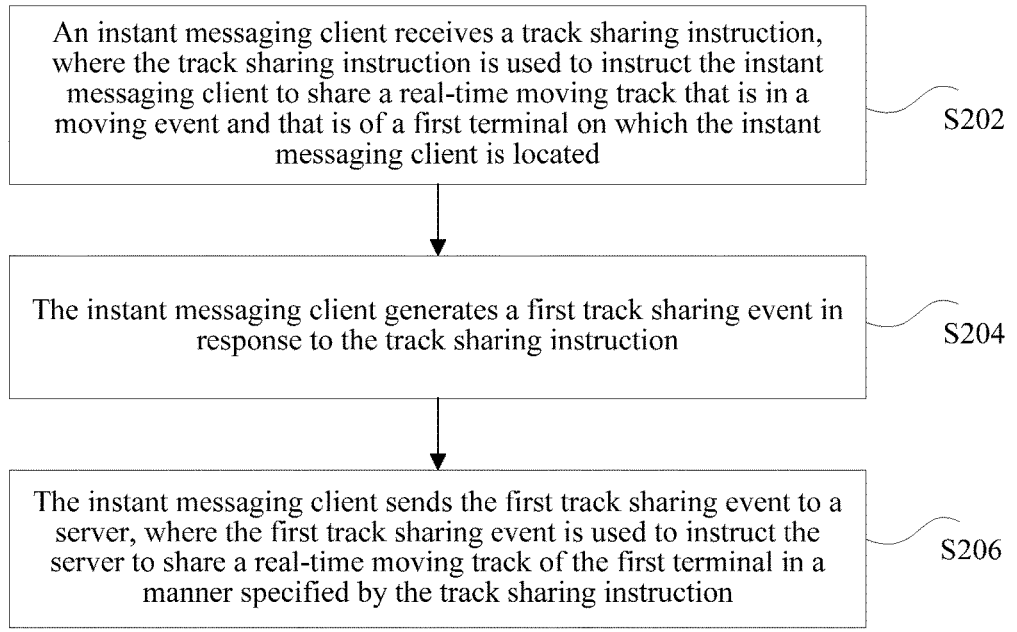
FIG. 2 illustrates a flowchart of an optional moving-track sharing method according to an embodiment of the present invention.

As shown in FIG. 2, a moving-track sharing solution provided by the present disclosure may include the followings.

S202: An instant messaging (IM) client receives a track-sharing instruction, where the track-sharing instruction is used to instruct the instant messaging client to share a real-time moving-track of a first terminal, where the instant messaging client is located, in a moving event.

S204: The instant messaging client generates a first track-sharing event in response to the track-sharing instruction.

S206: The instant messaging client sends the first track-sharing event to a server, where the first track-sharing event is used to instruct the server to share a real-time moving-track of the first terminal in a manner specified by the track-sharing instruction.

In the foregoing embodiment of the present invention, after the instant messaging client receives the sharing instruction to share the real-time moving-track of the first terminal in which the instant messaging client is located, the instant messaging client generates the first track-sharing event, and instructs, by using the first track-sharing event, the server (such as an instant messaging server) corresponding to the instant messaging client to share the real-time moving-track of the first terminal. According to the foregoing embodiment, the problem that a moving-track of a user cannot be shared in the existing technology can be resolved.

Optionally, that an instant messaging client receives a track-sharing instruction includes: displaying, on a real-time track page on a screen of the first terminal, a real-time moving-track and a real-time geographic location that are of the first terminal; and receiving the track-sharing instruction by using the real-time track page.

When a moving event occurs, the first terminal may enable a positioning function of the first terminal, record a geographic location of the first terminal at each moment since the positioning function is enabled, generate the real-time moving-track of the first terminal by using the positioning function, and display the real-time moving-track on the real-time track page on a screen of the first terminal. The user may operate a sharing button of the real-time track page displayed on the screen of the first terminal, to generate the sharing instruction to share the real-time moving-track of the first terminal by using the instant messaging client. After receiving the sharing instruction, the instant messaging client generates the first track-sharing event in response of the sharing instruction, and sends the first track-sharing event to the server. After receiving the first track-sharing event, the server shares, in a sharing manner indicated by the sharing instruction, the real-time moving-track of the first terminal with a second terminal in which the instant messaging client is installed, and then the second terminal can obtain the real-time moving-track of the first terminal.

According to the foregoing embodiment, the moving-track of a terminal with the instant messaging client may be shared in real time.

Specifically, the real-time geographic location of the first terminal is obtained in real-time by using a positioning service of the first terminal, and the real-time moving-track of the first terminal is updated in real time. The real-time geographic location of the first terminal may be further positioned in real time by using the positioning service of the first terminal, the real-time geographic location obtained by the real-time positioning may be sent to the instant messaging client, and the instant messaging client may draw the real-time moving-track of the first terminal.

In the foregoing embodiment, that the instant messaging client generates a first track-sharing event in response to the track-sharing instruction includes: obtaining, by the instant messaging client, a first moving-track of the first terminal that is within a first sharing time segment. In response to the track-sharing instruction, the instant messaging client generates the first track-sharing event that carries at least the first moving-track, where the real-time moving-track includes the first moving-track.

Specifically, when the instant messaging client receives the sharing instruction, the instant messaging client may obtain the first moving-track of the first terminal that is already complete in the moving event from the positioning service of the first terminal at the same time; or may send a request to the positioning service after receiving the sharing instruction, to obtain the first moving-track of the first terminal that is already completed. After obtaining the first moving-track, the instant messaging client generates the first track-sharing event that carries at least the first moving-track.

Optionally, the first track-sharing event may further include the sharing manner indicated by the sharing instruction. After receiving the first track-sharing event, the server notifies the second terminal of the first track-sharing event in the sharing manner indicated by the sharing instruction.

Further, when the server notifies the second terminal of the first track-sharing event, the server may send the first moving-track to the second terminal at the same time.

In an embodiment, that the instant messaging client sends the first track-sharing event to a server may further include: sending, by the instant messaging client in real time, a second moving-track generated in the moving event by the first terminal to the server, where the real-time moving-track includes the first moving-track and the second moving-track. The second moving-track is a moving-track generated after the first moving-track.

Specifically, after sending the first track-sharing event that carries at least the first moving-track to the server, the instant messaging client draws a second moving-track of the first terminal following the first moving-track in real time, and sends the second moving-track to the server in real time. That is, after sending the first track-sharing event to the server, the instant messaging client sends amount of change in the real-time moving-track of the first terminal to the server in real time.

Optionally, after sending the first track-sharing event to the server, the instant messaging client obtains, in real time, a real-time geographic location obtained by the first terminal by the positioning function after the first moving-track, and sends the real-time geographic location to the server. The server draws the second moving-track corresponding to the real-time geographic location.

In another embodiment, after the sending, by the instant messaging client, the first track-sharing event to the server, the method further includes: receiving, by the instant messaging client, a first track sharing request sent by the server; and sending, to the server, a third moving-track generated by the first terminal within a second sharing time segment indicated by the first track sharing request, where the real-time moving-track includes the first moving-track and the third moving-track.

According to the foregoing embodiments of the present invention, the moving-track may be shared according to the sharing time segment and the received sharing request.

In another embodiment, after the instant messaging client sends the first track-sharing event that carries at least the first moving-track to the server, the server notifies the second terminal of the first track-sharing event of the first terminal. After receiving response information of the second terminal, the server generates a first track sharing request, and returns the first track sharing request to the first terminal. After obtaining the first track sharing request, the instant messaging client of the first terminal sends a third moving-track of the first terminal to the server in response to the first track sharing request, and after sending the third moving-track to the server, sends a fourth moving-track to the server in real time, where the fourth moving-track is generated after the third moving-track by the first terminal in real time in the moving event.

In another embodiment, after the sending, by the instant messaging client, the first track-sharing event to the server, the method may further include: sending, by the instant messaging client, a fifth moving-track already generated by the first terminal in the moving event to the server, and sending, in real time, a sixth moving-track generated after the fifth moving-track by the first terminal in the moving event to the server, where the real-time moving-track includes the fifth moving-track and the sixth moving-track.

In one embodiment, the first track-sharing event sent by the instant messaging client to the server may carry the sharing manner indicated by the sharing instruction. In one embodiment, the first track-sharing event sent by the instant messaging client to the server does not carry a moving-track of the instant messaging client that is already completed.

In another embodiment, after the sending, by the instant messaging client, the first track-sharing event to the server, the method may further include: receiving, by the instant messaging client, a second track sharing request sent by the server; sending, by the instant messaging client in response to the second track sharing request, a seventh moving-track already generated by the first terminal in the moving event to the server, and sending, in real time, an eighth moving-track generated after the seventh moving-track by the first terminal in the moving event to the server, where the real-time moving-track includes the seventh moving-track and the eighth moving-track.

Specifically, the first track-sharing event sent by the instant messaging client to the server may carry the sharing manner indicated by the sharing instruction. In one embodiment, the first track-sharing event sent by the instant messaging client to the server does not carry a moving-track of the instant messaging client that is already completed.

After the instant messaging client sends the first track-sharing event to the server, and receives the second track sharing request of the server, the instant messaging client sends the seventh moving-track already generated in the moving event to the server, and sends, in real time, the eighth moving-track generated after the seventh moving-track by the first terminal in the moving event to the server.

Figure 3:
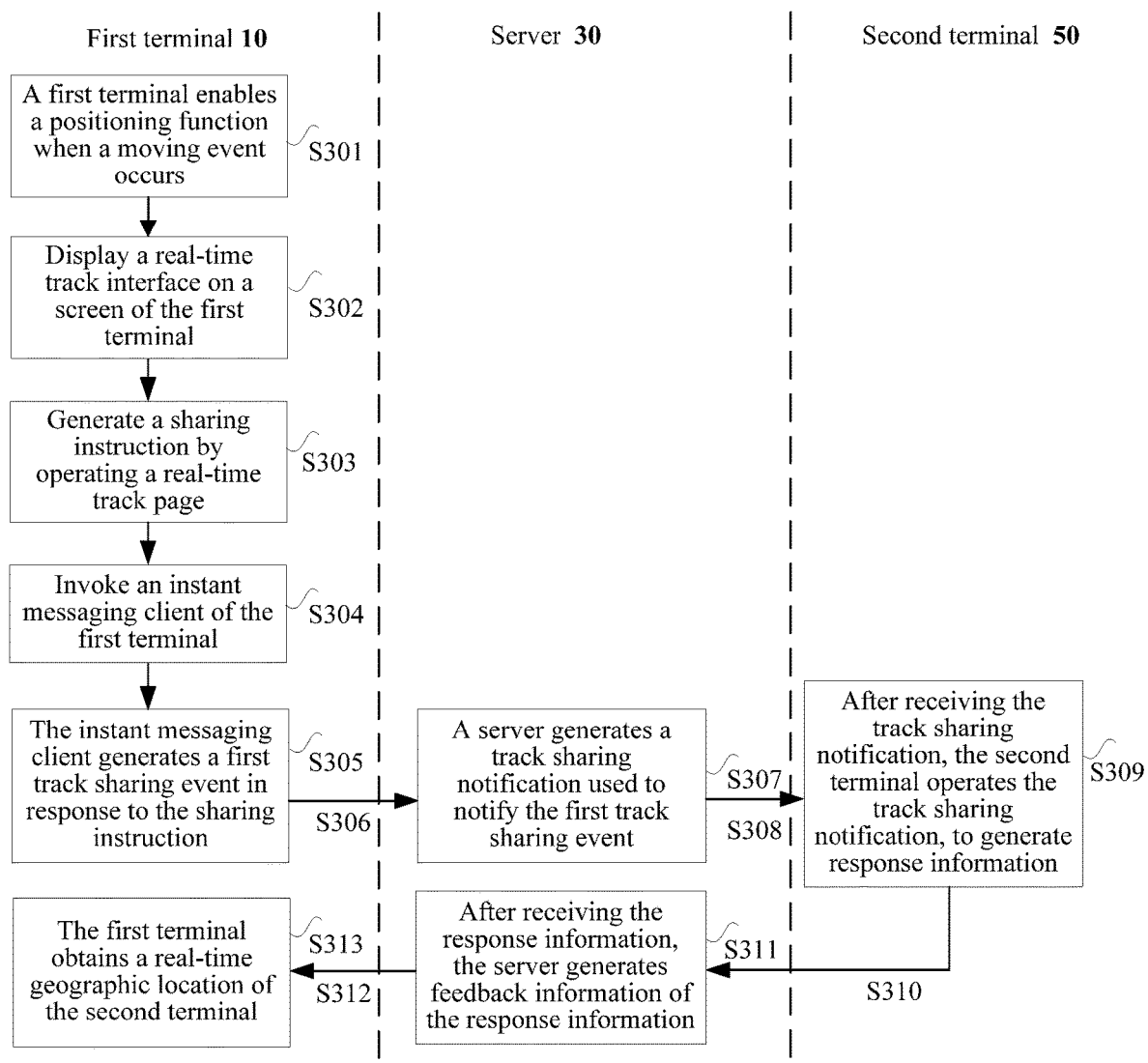
FIG. 3 illustrates a sequence diagram of another optional moving-track sharing method according to an embodiment of the present invention.

The following describes the foregoing embodiment of the present invention with reference to FIG. 3. As shown in FIG. 3, the embodiment may include the following steps.

S301: The first terminal enables a positioning function when the moving event occurs.

Optionally, the first terminal may invoke the positioning function by using the instant messaging client; or may invoke the positioning function from a main operating system of the first terminal. No limitation is intended herein.

S302: Displaying a real-time track interface on a screen of the first terminal.

Optionally, after the positioning function is enabled, a geographic location of the first terminal at each positioning moment may be recorded by using the positioning function, the real-time moving-track of the first terminal may be generated by using the positioning function, and the real-time moving-track may be displayed on the real-time track page on the screen of the first terminal.

S303: Generating the sharing instruction by operating a real-time track page.

Specifically, the foregoing operation may include: clicking a sharing button on the real-time track page.

A user may operate the sharing button on the real-time track page that is displayed on the screen of the first terminal, to generate the sharing instruction to share the real-time moving-track of the first terminal by using the instant messaging client.

Optionally, the operation may be a clicking operation.

S304: Invoking the instant messaging client of the first terminal.

S305: The instant messaging client generates the first track-sharing event in response to the sharing instruction.

Optionally, when generating the first track-sharing event, the instant messaging client may add the first moving-track of the first terminal that is already completed to the first track-sharing event. If the instant messaging client does not add the first moving-track of the first terminal that is already completed to the first track-sharing event, the instant messaging client may send, after sending the first track-sharing event, a moving-track of the first terminal that is already completed.

S306: The instant messaging client sends the first track-sharing event to the server.

Optionally, if the first track-sharing event generated by the instant messaging client does not carry the first moving-track, after performing the step of sending, the instant messaging client may send the fifth moving-track generated by the instant messaging client to the server, and send the sixth moving-track to the server in real time.

If the first track-sharing event generated by the instant messaging client carries the first moving-track, after performing the step of sending, the instant messaging client may send the second moving-track generated in real time by the instant messaging client to the server.

S307: The server generates a track sharing notification used to notify the first track-sharing event.

Optionally, after the track-sharing instruction is received by using the real-time track page, the track sharing notification is displayed in a session between a second account that logs on to an instant messaging client of a second terminal and a first account that logs on to the instant messaging client of the first terminal, where the track sharing notification carries a page link of the real-time track page of the first terminal. After it is detected that the second terminal operates the track sharing notification, a real-time geographic location of the second terminal is displayed on the real-time track page of the first terminal, where the second terminal enters the real-time track page by using the page link.

The track sharing notification may carry the page link of the real-time track page of the first terminal.

S308: The server sends the track sharing notification to a second terminal in a sharing manner indicated by the sharing instruction.

S309: After receiving the track sharing notification, the second terminal operates the track sharing notification, to generate response information.

Optionally, the operating the track sharing notification may be: clicking the page link of the real-time track page of the first terminal in the track sharing notification, to generate the response information, and enter the real-time track page of the real-time track page.

It should be noted that, after receiving the track sharing notification, the instant messaging client of the second terminal displays the track sharing notification in the chatting session between the second account that logs on to the instant messaging client of the second terminal and the first account that logs on to the instant messaging client of the first terminal.

Further, optionally, after operating the track sharing notification, the second terminal may obtain the real-time geographic location of the second terminal, and add the real-time geographic location of the second terminal to the response information.

S310: The second terminal sends the response information to the server.

S311: After receiving the response information, the server generates feedback information of the response information.

Optionally, the feedback information may be the first track sharing request, and if the response information of the second terminal carries the real-time geographic location of the second terminal, the first track sharing request generated by the server may carry the real-time geographic location of the second terminal.

S312: The server sends the feedback information to the first terminal.

S313: The first terminal obtains the real-time geographic location of the second terminal.

Further, optionally, after receiving the information from the server, the first terminal clicks the link in the session between the first account and the second account, to generate a location request, and sends the location request to the server. After receiving the location request, the server delivers the stored real-time geographic location of the second terminal to the instant messaging client of the first terminal, or requests the real-time geographic location of the second terminal from the second terminal, and after obtaining the real-time geographic location of the second terminal, sends the real-time geographic location of the second terminal to the instant messaging client of the first terminal.

Figure 4:
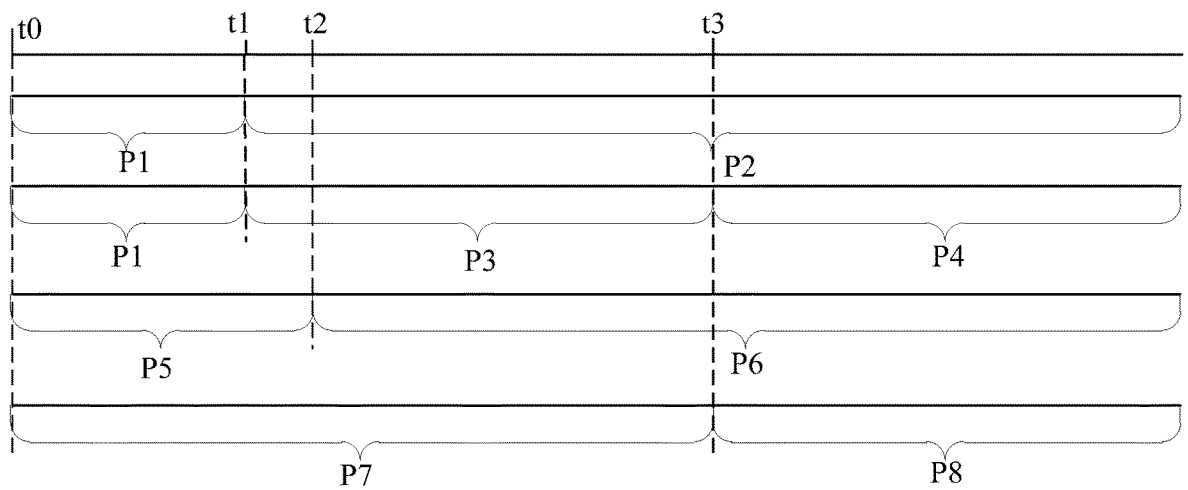
FIG. 4 illustrates a schematic diagram of a correspondence between the moving-track and time according to an embodiment of the present invention.

The following provides exemplary descriptions about the first moving-track to the eighth moving-track in the foregoing embodiments of the present invention with reference to FIG. 4.

As shown in FIG. 4, a t0 moment indicates the moment at which the first terminal enables the positioning function, a t1 moment indicates the moment at which the first track-sharing event is generated, t2 indicates the moment at which the first track-sharing event is sent, t3 indicates the moment at which the first track sharing request is received; P1 indicates the first moving-track, P2 indicates the second moving-track, P3 indicates the third moving-track, P4 indicates the fourth moving-track, P5 indicates the fifth moving-track, P6 indicates the sixth moving-track, P7 indicates the seventh moving-track, and P8 indicates the eighth moving-track.

Specifically, in an example in which the first moving-track and the second moving-track are sent, the first moving-track P1 is generated within a time segment between the t0 moment and the t1 moment, and the second moving-track P2 is generated after the t1 moment. That is, the shared first moving-track is already generated before the t1 moment, and the second moving-track is generated after the t1 moment.

In an example in which the first moving-track, the second moving-track, and the third moving-track are sent, the first moving-track P1 is generated within the time segment between the t0 moment and the t1 moment, the third moving-track P3 is generated within a time segment between the t1 moment and the t3 moment, and the fourth moving-track P4 is generated after the t3 moment.

In an example in which the fifth moving-track and the sixth moving-track are sent, the fifth moving-track P5 is generated within a time segment between the t0 moment and the t2 moment, and the sixth moving-track is generated after the t2 moment.

In an example in which the seventh moving-track and the eighth moving-track are sent, the seventh moving-track is generated within a time segment between the t0 moment and the t3 moment, and the eighth moving-track is generated after the t3 moment.

As shown in FIG. 4, in the four sending manners in the foregoing embodiments of the present invention, sending the real-time moving-track of the first terminal to the second terminal by using the server can all be implemented.

According to the foregoing embodiments of the present invention, the first account logs on to the instant messaging client, where the sharing manner specified by the track-sharing instruction includes one of the following: sharing the real-time moving-track of the first terminal with one or more second accounts in an associated account list of the first account in the instant messaging client; and notifying, by using the server corresponding to the instant messaging client, each account in an associated account list of the first account in the instant messaging client of a second track-sharing event used to share the real-time moving-track of the first terminal.

It should be noted that, the associated account list may be a friend list, and information about an account of a friend is recorded in the list, where the account and the first account follow each other.

In the foregoing embodiments, the sharing instruction may instruct the server to share the real-time moving-track of the first terminal in a manner of directional sending or nondirectional sending.

Specifically, the manner of directional sending may be sending the real-time moving-track of the first terminal to one or more second accounts in the friend list; the manner of nondirectional sending may be sending the real-time moving-track of the first terminal to each friend in the friend list of the first account, or sending the real-time moving-track of the first terminal to an information sending location of the first account, where the information sending location may be accessed by each friend of the friend list of the first account, for example, a friend circle or Weibo.

Further, that an instant messaging client receives a track-sharing instruction includes: receiving, by the instant messaging client, a track-sharing instruction when the first account and the one or more second accounts are in a same chatting or other IM session.

Specifically, a session may be selected from current sessions of the instant messaging client, and the instant messaging client receives one or more second accounts that send the real-time moving-track of the first terminal to the selected session.

Optionally, one or more second accounts may be selected from a friend list of the first account that logs on to the instant messaging client, a session between the first account and the one or more second account may be created, and the real-time moving-track of the first terminal may be shared by using the created session.

Figure 5:
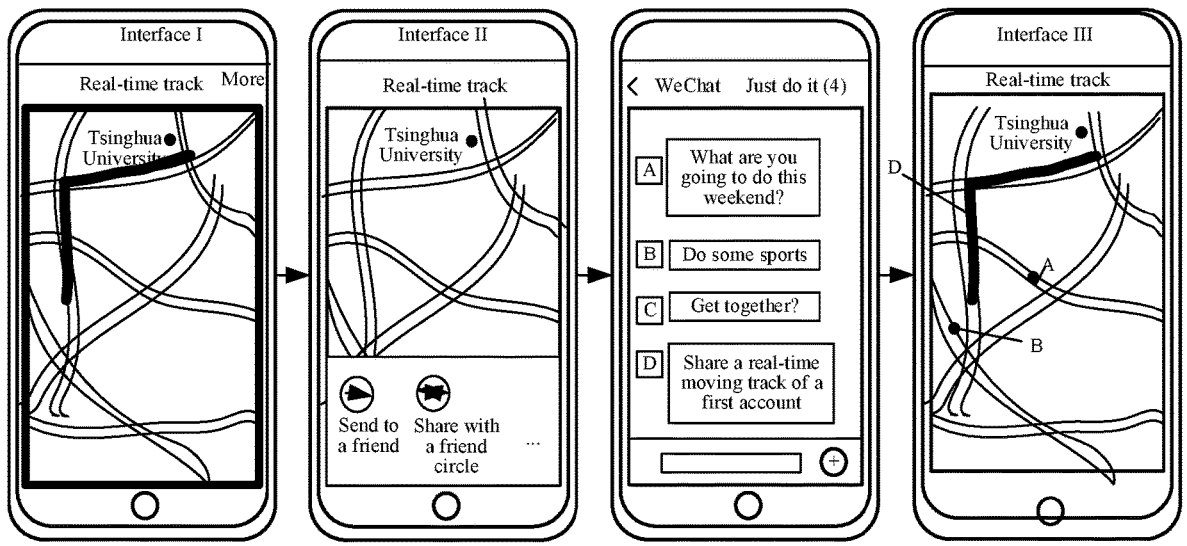
FIG. 5 illustrates a schematic diagram of an interface of a moving-track sharing method according to an embodiment of the present invention.

The following describes the foregoing embodiments of the present invention in detail with reference to FIG. 5.

When a moving event occurs, the first terminal may enable a positioning function of the first terminal, record a geographic location of the first terminal at each moment since the positioning function is enabled, generate the real-time moving-track of the first terminal by using the positioning function, and display the real-time moving-track on the real-time track page (such as an interface A shown in FIG. 5) on a screen of the first terminal. The user may enter an interface B by clicking the "More" button on the upper right corner of the interface I. A sharing manner is displayed on the interface II, and the sharing manner includes: sending to a friend, and sharing with a friend circle or Moments in WeChat. The user may click a corresponding icon of a sharing manner on the interface B to determine the sharing manner. For example, the user may click "Send to a friend", and then the instant messaging client (such as a WeChat client or a QQ client) is invoked, to display a friend list or a session list of a first account that logs on to the instant messaging client (the WeChat client is used as an example) on a screen of the first terminal. The user clicks a corresponding session or a selected second account (there may be one or more second accounts, for example, in the "Just do it" session shown in FIG. 5, A, B, and C are second accounts relative to D, and D is the first account) to generate a sharing instruction. After receiving the sharing instruction, the instant messaging client (the WeChat client is used as an example) generates a first track-sharing event in response to the sharing instruction, and sends the first track-sharing event to the server. After receiving the first track-sharing event, the server notifies a second account that the first terminal has shared the real-time moving-track, as shown on an interface III in FIG. 5. The interface III is a window of a session between the second account and the first account, and a link of the real-time track page of the first terminal is displayed in the session window. The second account of the second terminal may click the link to generate response information. Optionally, the second account of the second terminal may add the real-time geographic location of the second terminal to the response information.

Optionally, after generating the first track-sharing event, the first terminal displays, in the instant messaging client, the window of the session between the first account and the second account. The first track-sharing event (the link of the real-time track page of the first terminal is displayed in the first track-sharing event) may be displayed in the session window. A user of the instant messaging client of the first terminal may click the link to enter the real-time track page of the first terminal. The first terminal clicks the link to generate a clicking event, and sends the clicking event to the server. After receiving the clicking event, the server sends the real-time geographic location of the second terminal to the first terminal. In this way, not only the real-time moving-track of the first terminal but also real-time geographic locations of two second accounts are displayed on the real-time track page displayed on the screen of the first terminal.

According to the foregoing embodiments of the present invention, an initiation user may share a real-time coordinate path of the initiation user with a friend by using a social application. A participant may enter an H5 embedded page, to view a location of a vehicle of the initiation user, a location of another participant, a track chart of the vehicle on the map, and a relationship between a participant and a track.

It should be noted that, according to the foregoing method embodiments, for brief descriptions, the method embodiments are described as a combination of a series of actions. However, a person skilled in the art should know that, the present disclosure is not limited by an action sequence that is described, because some steps may be performed in another sequence or simultaneously according to the present disclosure. Second, the person skilled in the art should also know that, all the embodiments described in the specification are preferable embodiments, and involved actions and modules are not necessarily required by the present disclosure.

According to the foregoing descriptions of implementations, the person skilled in the art may clearly know that the method according to the foregoing embodiments may be implemented by using software and a necessary general hardware platform, or certainly may be implemented by using hardware. However, in most cases, the former is a preferred implementation. Based on such understanding, a technical solution of the present invention essentially or a portion of the technical solution of the present invention and that has contributions to the existing technology may be embodied in a software product form. The computer software product is stored in a storage medium (such as a ROM/RAM, a magnetic disk, or an optical disc), and includes several instructions used to make a terminal device (which may be a mobile phone, a computer, a server, or a network device) execute the method in the embodiments of the present invention.

Figure 6:
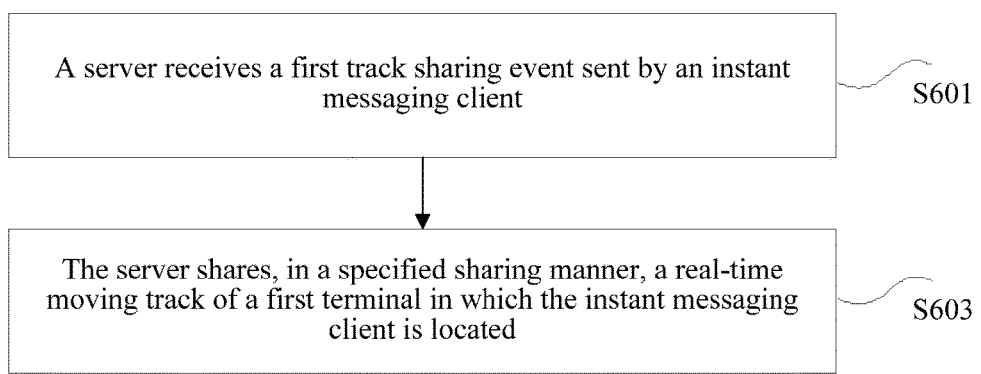
FIG. 6 illustrates a flowchart of another moving-track sharing method according to an embodiment of the present invention.

The disclosure of the present invention further provides a moving-track sharing method. The method is also applied to the network environment shown in FIG. 1. As shown in FIG. 6, the method includes the following steps:

S601: A server receives a first track-sharing event sent by an instant messaging client, where the first track-sharing event carries a specified sharing manner. The first track-sharing event is used to instruct the server to share, in the specified sharing manner, a real-time moving-track of a first terminal in which the instant messaging client is located.

S603: The server shares, in the specified sharing manner, a real-time moving-track of the first terminal in which the instant messaging client is located.

In the foregoing embodiment of the present invention, the server receives the first track-sharing event of the instant messaging client, and the server shares, in the specified sharing manner, the real-time moving-track of the first terminal in which the instant messaging client is located. According to the foregoing embodiment, the problem that a moving-track of a user cannot be shared in the existing technology can be resolved.

When a moving event occurs, the first terminal may enable a positioning function of the first terminal, record a geographic location of the first terminal at each moment since the positioning function is enabled, generate the real-time moving-track of the first terminal by using the positioning function, and display the real-time moving-track on the real-time track page on a screen of the first terminal. The user may operate a sharing button of the real-time track page displayed on the screen of the first terminal, to generate the sharing instruction to share the real-time moving-track of the first terminal by using the instant messaging client. After receiving the sharing instruction, the instant messaging client generates the first track-sharing event in response of the sharing instruction, and sends the first track-sharing event to the server. After receiving the first track-sharing event, the server shares, in a sharing manner indicated by the sharing instruction, the real-time moving-track of the first terminal with a second terminal in which the instant messaging client is installed, and then the second terminal can obtain the real-time moving-track of the first terminal.

According to the foregoing embodiment, a moving-track of a terminal in which the instant messaging client is installed may be shared in real time.

According to the foregoing embodiment of the present invention, the first account logs on to the instant messaging client, where that the server shares, in the specified sharing manner, the real-time moving-track of the first terminal in which the instant messaging client is located includes: sharing, by the server, the real-time moving-track of the first terminal with one or more second accounts in an associated account list of the first account in the instant messaging client; and notifying each account in an associated account list of the first account in the instant messaging client of a second track-sharing event used to share the real-time moving-track of the first terminal.

In the foregoing embodiment, the sharing instruction may instruct the server to share the real-time moving-track of the first terminal in a manner of directional sending or nondirectional sending.

Specifically, the manner of directional sending may be sending the real-time moving-track of the first terminal to one or more specific second accounts in the friend list; the manner of nondirectional sending may be sending the real-time moving-track of the first terminal to each friend in the friend list of the first account, or sending the real-time moving-track of the first terminal to an information sending location of the first account, where the information sending location may be accessed by each friend of the friend list of the first account, for example, a friend circle or Weibo.

Further, that an instant messaging client receives a track-sharing instruction includes: receiving, by the instant messaging client, a track-sharing instruction when the first account and the one or more second accounts are in a same session.

Further, the sharing, by the server, the real-time moving-track of the first terminal with one or more second accounts in an associated account list of the first account in the instant messaging client includes: sharing, by the server, the real-time moving-track of the first terminal with the one or more second accounts that are in a same session with the first account.

According to the foregoing embodiment, the real-time moving-track of the first terminal may be sent to a friend circle or a friend, and multiple sharing manners are provided.

According to the foregoing embodiment of the present invention, that the server shares, in the specified sharing manner, the real-time moving-track of the first terminal in which the instant messaging client is located includes: extracting, by the server from the first track-sharing event, a first moving-track of the first terminal within a first sharing time segment, where the real-time moving-track includes the first moving-track; and sending, by the server, the first moving-track to a second terminal in the specified sharing manner.

Specifically, when the instant messaging client receives the sharing instruction, the instant messaging client may obtain the first moving-track that is generated by the first terminal within the first sharing time segment in the moving event from the positioning service of the first terminal at the same time; or may send a request to the positioning service after receiving the sharing instruction, to obtain the first moving-track of the first terminal that is already completed. After obtaining the first moving-track, the instant messaging client generates the first track-sharing event that carries at least the first moving-track.

Optionally, the first track-sharing event may further include the sharing manner indicated by the sharing instruction. After receiving the first track-sharing event, the server notifies the second terminal of the first track-sharing event in the sharing manner indicated by the sharing instruction.

Further, when the server notifies the second terminal of the first track-sharing event, the server may send the first moving-track to the second terminal at the same time.

According to the foregoing embodiment of the present invention, that the server shares, in the specified sharing manner, the real-time moving-track of the first terminal in which the instant messaging client is located includes: receiving, by the server, a second moving-track that is sent by the instant messaging client in real time and that is generated in the moving event by the first terminal after the first moving-track, where the real-time moving-track includes the first moving-track and the second moving-track; and sending, by the server, the second moving-track to the second terminal in the specified sharing manner.

After receiving a first track sharing request of the second terminal, the server sends, to the server, a third moving-track generated by the first terminal within a second sharing time segment indicated by the first track sharing request, where the real-time moving-track includes the first moving-track and the third moving-track.

According to the foregoing embodiments of the present invention, an initiation user may share a real-time coordinate path of the initiation user with a friend by using a social application. A participant may enter an H5 embedded page, to view a location of a vehicle of the initiation user, a location of another participant, a track chart of the vehicle on the map, and a relationship between a participant and a track.

It should be noted that, according to the foregoing method embodiments, for brief descriptions, the method embodiments are described as a combination of a series of actions. However, a person skilled in the art should know that, the present disclosure is not limited by an action sequence that is described, because some steps may be performed in another sequence or simultaneously according to the present disclosure. Second, the person skilled in the art should also know that, all the embodiments described in the specification are preferable embodiments, and involved actions and modules are not necessarily required by the present disclosure.

Figure 7:
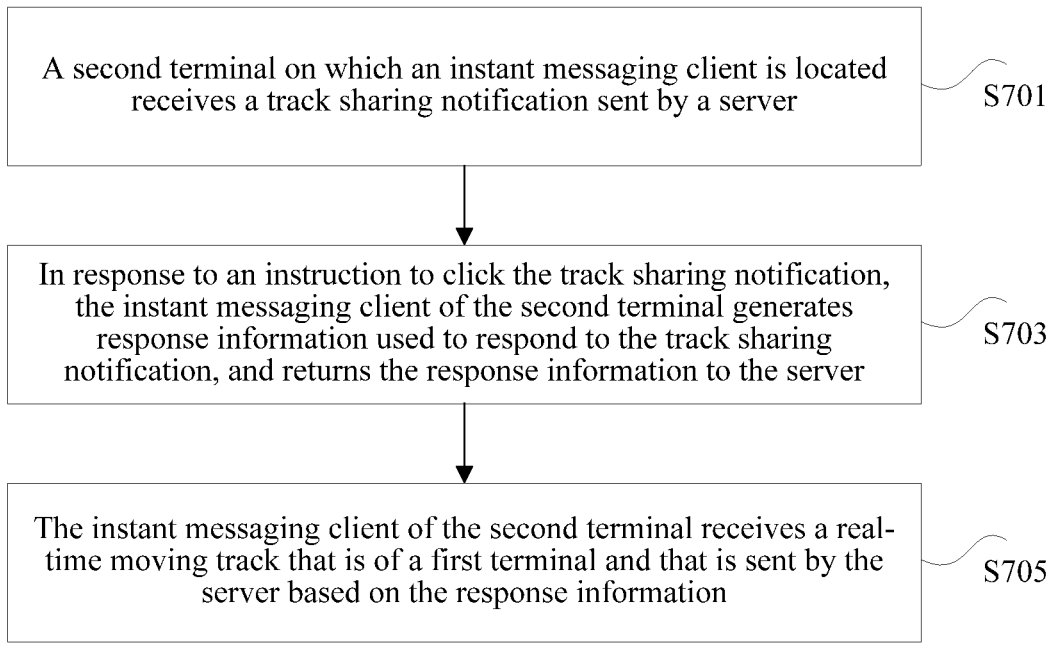
FIG. 7 illustrates a flowchart of another moving-track sharing method according to an embodiment of the present invention.

The present disclosure further provides a moving-track sharing method. The method may also be applied to the network environment shown in FIG. 1. As shown in FIG. 7, the method includes the followings.

S701: A second terminal in which an instant messaging client is located receives a track sharing notification sent by a server, where the track sharing notification is used to notify that a first terminal has shared a real-time moving-track of the first terminal by using the instant messaging client.

S703: In response to an instruction to click the track sharing notification, the instant messaging client of the second terminal generates response information used to respond to the track sharing notification, and returns the response information to the server.

S705: The instant messaging client of the second terminal receives the real-time moving-track of the first terminal sent by the server based on the response information.

In the foregoing embodiment of the present invention, after receiving the track sharing notification of the server, the instant messaging client of the second terminal clicks the track sharing notification to generate the response information, returns the response information to the server, and receives the real-time moving-track that is shared by the server in the specified sharing manner and of the first terminal in which the instant messaging client is located. According to the foregoing embodiment, the problem that a moving-track of a user cannot be shared in the existing technology may be resolved.

When a moving event occurs, the first terminal may enable a positioning function of the first terminal, record a geographic location of the first terminal at each moment since the positioning function is enabled, generate the real-time moving-track of the first terminal by using the positioning function, and display the real-time moving-track on the real-time track page on a screen of the first terminal. The user may operate a sharing button of the real-time track page displayed on the screen of the first terminal, to generate the sharing instruction to share the real-time moving-track of the first terminal by using the instant messaging client. After receiving the sharing instruction, the instant messaging client generates the first track-sharing event in response of the sharing instruction, and sends the first track-sharing event to the server. After receiving the first track-sharing event, the server shares, in a sharing manner indicated by the sharing instruction, the real-time moving-track of the first terminal with the second terminal in which the instant messaging client is installed, and then the second terminal can obtain the real-time moving-track of the first terminal.

According to the foregoing embodiment, a moving-track of a terminal in which the instant messaging client is installed may be shared in real time.

According to the foregoing embodiment of the present invention, the first account logs on to the instant messaging client of the first terminal, and the second account logs on to the instant messaging client of the second terminal, where receiving, by the second terminal in which an instant messaging client is located, a track sharing notification sent by a server includes: receiving, by the instant messaging client of the second terminal, the track sharing notification when the first account and the second account are in a same session; and receiving the track sharing notification at an information receiving location of the instant messaging client of the second terminal, where the information receiving location is used to receive a notification that is sent by the server and of each account in an associated account list of the second account.

In the foregoing embodiment, the second terminal may be in a same session with the first account, or may obtain the track sharing notification by using a friend circle of the second terminal.

According to the foregoing embodiments of the present invention, an initiation user may share a real-time coordinate path of the initiation user with a friend by using a social network application. A participant may enter an H5 embedded page, to view a location of a vehicle of the initiation user, a location of another participant, a track chart of the vehicle on the map, and a relationship between a participant and a track.

It should be noted that, according to the foregoing method embodiments, for brief descriptions, the method embodiments are described as a combination of a series of actions. However, a person skilled in the art should know that, the present disclosure is not limited by an action sequence that is described, because some steps may be performed in another sequence or simultaneously according to the present disclosure. Second, the person skilled in the art should also know that, all the embodiments described in the specification are preferable embodiments, and involved actions and modules are not necessarily required by the present disclosure.

Figure 8:
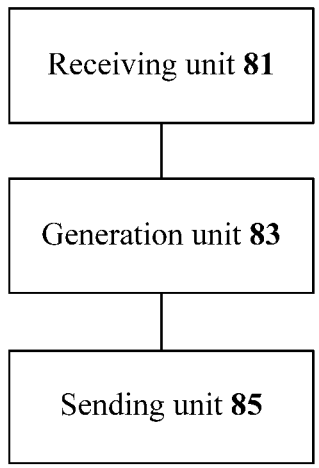
FIG. 8 illustrates a schematic diagram of an optional moving-track sharing apparatus according to an embodiment of the present invention.

According to an embodiment of the present invention, a moving-track sharing apparatus is further provided. As shown in FIG. 8, the apparatus includes a receiving unit 81, a generation unit 83, and a sending unit 85.

The receiving unit 81 is configured to receive a track-sharing instruction, where the track-sharing instruction is used to instruct the instant messaging client to share a real-time moving-track that is in a moving event and of a first terminal in which the instant messaging client is located.

The generation unit 83 is configured to generate a first track-sharing event in response to the track-sharing instruction.

The sending unit 85 is configured to send the first track-sharing event to a server, where the first track-sharing event is used to instruct the server to share a real-time moving-track of the first terminal in a manner specified by the track-sharing instruction.

In the foregoing embodiments of the present invention, after the instant messaging client receives the sharing instruction to share the real-time moving-track of the first terminal in which the instant messaging client is located, the instant messaging client generates the first track-sharing event, and instructs, by using the first track-sharing event, the server (such as an instant messaging server) corresponding to the instant messaging client to share the real-time moving-track of the first terminal. According to the foregoing embodiment, the problem that a moving-track of a user cannot be shared in the existing technology may be resolved.

When a moving event occurs, the first terminal may enable a positioning function of the first terminal, record a geographic location of the first terminal at each moment since the positioning function is enabled, generate the real-time moving-track of the first terminal by using the positioning function, and display the real-time moving-track on the real-time track page on a screen of the first terminal. The user may operate a sharing button of the real-time track page displayed on the screen of the first terminal, to generate the sharing instruction to share the real-time moving-track of the first terminal by using the instant messaging client. After receiving the sharing instruction, the instant messaging client generates the first track-sharing event in response of the sharing instruction, and sends the first track-sharing event to the server. After receiving the first track-sharing event, the server shares, in a sharing manner indicated by the sharing instruction, the real-time moving-track of the first terminal with a second terminal in which the instant messaging client is installed, and then the second terminal can obtain the real-time moving-track of the first terminal.

According to the foregoing embodiment, a moving-track of a terminal in which the instant messaging client is installed may be shared in real time.

Optionally, the generation unit include: a track obtaining module, configured to obtain a first moving-track generated in a first sharing time segment by the first terminal; and an event generation module, configured to generate, in response to the track-sharing instruction, the first track-sharing event that carries at least the first moving-track, where the real-time moving-track includes the first moving-track.

In an embodiment, the apparatus may further include: a first sending unit, configured to: after the first track-sharing event is sent to the server, send to the server in real time, a second moving-track generated in the moving event by the first terminal after the first moving-track, where the real-time moving-track includes the first moving-track and the second moving-track.

The apparatus may further include a second sending unit, configured to: after the first track-sharing event is sent to the server, receive a first track sharing request sent by the server; and send, to the server, a third moving-track generated by the first terminal within a second sharing time segment indicated by the first track sharing request, where the real-time moving-track includes the first moving-track and the third moving-track.

According to the foregoing embodiments of the present invention, the first account logs on to the instant messaging client, where the sharing manner specified by the track-sharing instruction includes one of the following: sharing the real-time moving-track of the first terminal with one or more second accounts in an associated account list of the first account in the instant messaging client; and notifying, by using the server corresponding to the instant messaging client, each account in an associated account list of the first account in the instant messaging client of a second track-sharing event used to share the real-time moving-track of the first terminal.

Further, the receiving unit includes: a receiving module, configured to receive a track-sharing instruction when the first account and the one or more second accounts are in a same session.

According to the foregoing embodiments of the present invention, the user may share a real-time moving-track by using a friend circle or another manner. Specifically, an initiation user may share a real-time coordinate path of the initiation user with a friend by using a social network application. A participant may enter an H5 embedded page, to view a location of a vehicle of the initiation user, a location of another participant, a track chart of the vehicle on the map, and a relationship between a participant and a track.

Figure 9:
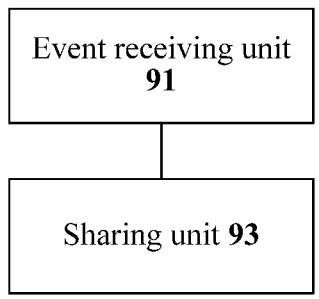
FIG. 9 illustrates a schematic diagram of an optional moving-track sharing apparatus according to an embodiment of the present invention.

According to an embodiment of the present invention, a moving-track sharing apparatus is further provided. As shown in FIG. 9, the apparatus includes an event receiving unit 91 and a sharing unit 93.

The event receiving unit 91 receives a first track-sharing event sent by an instant messaging client, where the first track-sharing event carries a specified sharing manner.

The sharing unit 93 is configured to share, in the specified sharing manner, a real-time moving-track of a first terminal in which the instant messaging client is located.

In the foregoing embodiment of the present invention, the server receives the first track-sharing event of the instant messaging client, and the server shares, in the specified sharing manner, the real-time moving-track of the first terminal in which the instant messaging client is located. According to the foregoing embodiment, the problem that a moving-track of a user cannot be shared in the existing technology may be resolved.

When a moving event occurs, the first terminal may enable a positioning function of the first terminal, record a geographic location of the first terminal at each moment since the positioning function is enabled, generate the real-time moving-track of the first terminal by using the positioning function, and display the real-time moving-track on the real-time track page on a screen of the first terminal. The user may operate a sharing button of the real-time track page displayed on the screen of the first terminal, to generate the sharing instruction to share the real-time moving-track of the first terminal by using the instant messaging client. After receiving the sharing instruction, the instant messaging client generates the first track-sharing event in response of the sharing instruction, and sends the first track-sharing event to the server. After receiving the first track-sharing event, the server shares, in a sharing manner indicated by the sharing instruction, the real-time moving-track of the first terminal with a second terminal in which the instant messaging client is installed, and then the second terminal can obtain the real-time moving-track of the first terminal.

According to the foregoing embodiment, a moving-track of a terminal in which the instant messaging client is installed may be shared in real time.

Optionally, a first account logs on to the instant messaging client, where the sharing unit includes: a first sharing module, configured to share the real-time moving-track of the first terminal with one or more second accounts in an associated account list of the first account in the instant messaging client; and a second sharing module, configured to notify each account in an associated account list of the first account in the instant messaging client of a second track-sharing event used to share the real-time moving-track of the first terminal.

Optionally, the first sharing module includes: a sharing sub-module, configured to share the real-time moving-track of the first terminal with the one or more second accounts that are in a same session with the first account.

Optionally, the sharing unit further includes: an extraction unit, configured to extract, from the first track-sharing event, a first moving-track of the first terminal that is already completed in the moving event, where the real-time moving-track includes a first moving-track; and a first track sending module, configured to send the first moving-track to the second terminal in the specified sharing manner.

Optionally, the sharing unit includes: a first track receiving module, configured to receive a second moving-track that is sent by the instant messaging client in real time and that is generated in the moving event by the first terminal after the first moving-track, where the real-time moving-track includes the first moving-track and the second moving-track; and a second track sending module, configured to send the second moving-track to the second terminal in the specified sharing manner.

According to the foregoing embodiments of the present invention, an initiation user may share a real-time coordinate path of the initiation user with a friend by using a social network application. A participant may enter an H5 embedded page, to view a location of a vehicle of the initiation user, a location of another participant, a track chart of the vehicle on the map, and a relationship between a participant and a track.

According to the present disclosure, a moving-track sharing apparatus is further provided. The apparatus may include: a notification receiving unit, configured to receive a track sharing notification sent by a server, where the track sharing notification is used to notify that a first terminal has shared a real-time moving-track of the first terminal by using the instant messaging client; a response unit, configured to: generate, in response to an instruction to click the track sharing notification, response information used to respond to the track sharing notification, and return the response information to the server; and a track receiving unit, configured to receive the real-time moving-track of the first terminal sent by the server.

In the foregoing embodiment of the present invention, after receiving the track sharing notification of the server, an instant messaging client of a second terminal clicks the track sharing notification to generate the response information, returns the response information to the server, and receives the real-time moving-track that is shared by the server in the specified sharing manner and of the first terminal in which the instant messaging client is located. According to the foregoing embodiment, the problem that a moving-track of a user cannot be shared in the existing technology may be resolved.

When a moving event occurs, the first terminal may enable a positioning function of the first terminal, record a geographic location of the first terminal at each moment since the positioning function is enabled, generate the real-time moving-track of the first terminal by using the positioning function, and display the real-time moving-track on the real-time track page on a screen of the first terminal. The user may operate a sharing button of the real-time track page displayed on the screen of the first terminal, to generate the sharing instruction to share the real-time moving-track of the first terminal by using the instant messaging client. After receiving the sharing instruction, the instant messaging client generates the first track-sharing event in response of the sharing instruction, and sends the first track-sharing event to the server. After receiving the first track-sharing event, the server shares, in a sharing manner indicated by the sharing instruction, the real-time moving-track of the first terminal with a second terminal in which the instant messaging client is installed, and then the second terminal can obtain the real-time moving-track of the first terminal.

According to the foregoing embodiment, a moving-track of a terminal in which the instant messaging client is installed may be shared in real time.

Optionally, the first account logs on to the instant messaging client of the first terminal, and a second account logs on to the instant messaging client of the second terminal, where the notification receiving unit includes: a first receiving module, configured to receive the track sharing notification when the first account and the second account are in a same session; and a second receiving module, configured to receive the track sharing notification at an information receiving location of the instant messaging client of the second terminal, where the information receiving location is used to receive a notification that is sent by the server and of each account in an associated account list of the second account.

According to the foregoing embodiments of the present invention, the user may share a real-time moving-track by using a friend circle or another manner. Specifically, an initiation user may share a real-time coordinate path of the initiation user with a friend by using a social network application. A participant may enter an H5 embedded page, to view a location of a vehicle of the initiation user, a location of another participant, a track chart of the vehicle on the map, and a relationship between a participant and a track.

According to an embodiment of the present invention, a server or a terminal may be provided to implement the foregoing moving-track sharing method and apparatus.

Figure 10:
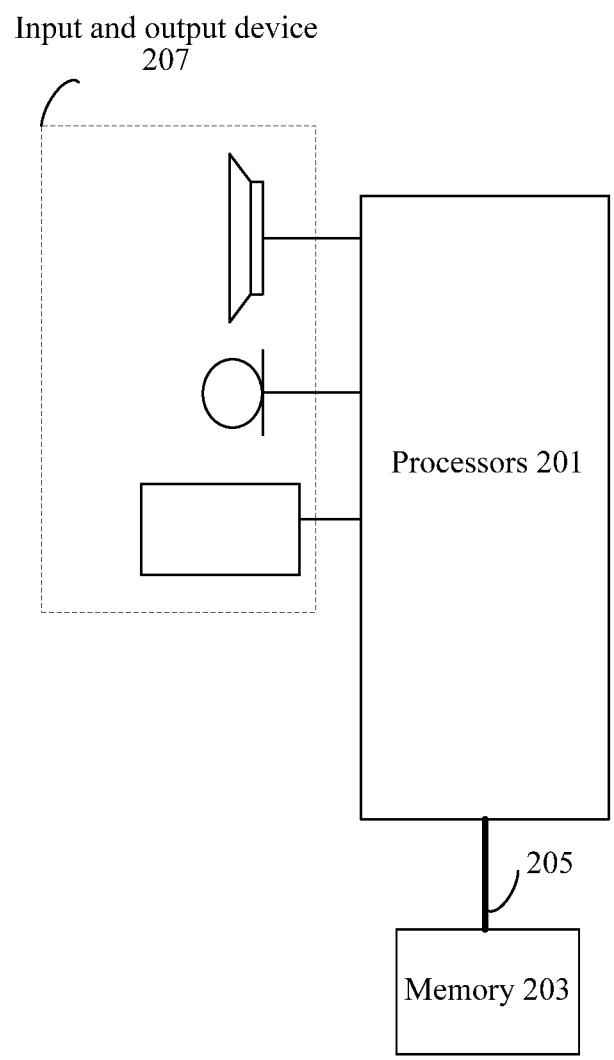
FIG. 10 illustrates a structural block diagram of a terminal according to an embodiment of the present invention.

As shown in FIG. 10, the server or the terminal includes: one or more (only one is shown in the figure) processors 201, a memory 203, and a transmission apparatus 205 (such as the sending apparatus in the foregoing embodiment). As shown in FIG. 10, the terminal may further include an input and output device 207.

The memory 203 may be configured to store a software program and module, such as a program instruction/module corresponding to the moving-track sharing method and apparatus in the embodiments of the present invention. The processor 201 runs the software program and module stored in the memory 203, so as to execute various function applications and data processing, that is, implement the foregoing moving-track sharing method. The memory 203 may include a high speed random access memory, and may further include a non-volatile memory, such as one or more magnetic storage apparatuses, flash memories, or other non-volatile solid-state memories. In some instances, the memory 203 may further include memories remotely set relative to the processor 201, and these remote memories may be connected to a terminal by using a network. An instance of the foregoing network includes but is not limited to the Internet, an enterprise intranet, a local area network, a mobile communications network, or a combination thereof.

The transmission apparatus 205 is configured to receive or send data by using a network, and may be further configured to transmit data between a processor and a memory. A specific instance of the foregoing network may include a wired network or a wireless network. In an instance, the transmission apparatus 205 includes a network interface controller (NIC), and the network interface controller may be connected to another network device or a router by using a network cable, so as to communicate with the Internet or a local area network. In an instance, the transmission apparatus 205 is a radio frequency (RF) module, and the radio frequency module is configured to communicate with the Internet in a wireless manner.

Specifically, the memory 203 is configured to store an application program.

The processor 201 may invoke, by using the transmission apparatus 205, the application program stored in the memory 203, to perform the following steps: receiving, by an instant messaging client, a track-sharing instruction, where the track-sharing instruction is used to instruct the instant messaging client to share a real-time moving-track that is in a moving event and of a first terminal in which the instant messaging client is located; generating, by the instant messaging client, a first track-sharing event in response to the track-sharing instruction; and sending, by the instant messaging client, the first track-sharing event to a server, where the first track-sharing event is used to instruct the server to share a real-time moving-track of the first terminal in a sharing manner specified by the track-sharing instruction.

In the foregoing embodiments of the present invention, after the instant messaging client receives the sharing instruction to share the real-time moving-track of the first terminal in which the instant messaging client is located, the instant messaging client generates the first track-sharing event, and instructs, by using the first track-sharing event, the server (such as an instant messaging server) corresponding to the instant messaging client to share the real-time moving-track of the first terminal. According to the foregoing embodiment, the problem that a moving-track of a user cannot be shared in the existing technology may be resolved.

It should be further noted that, a register area is a register in an internal memory of a system and a system processor.

A person of ordinary skill in the art may understand that, the structure shown in FIG. 10 is only exemplary, and the terminal may be a terminal device such as a smartphone (such as an Android mobile phone or an iOS mobile phone), a tablet computer, a palmtop computer, and a mobile Internet device (MID), or a PAD. FIG. 10 does not constitute a limitation on a structure of the foregoing electronic apparatus. For example, the terminal may further include more or fewer components (such as a network interface and a display apparatus) than those shown in FIG. 10, or may have a configuration different from that shown in FIG. 10.

An embodiment of the present invention further provides a storage medium. Optionally, in one embodiment, the storage medium may be provided to implement a moving-track sharing method.

Optionally, in one embodiment, the storage medium may be located in at least one network device of multiple network devices in a network shown in FIG. 1.

Optionally, in one embodiment, the storage medium is set to store program code used to perform the following steps: receiving, by an instant messaging client, a track-sharing instruction, where the track-sharing instruction is used to instruct the instant messaging client to share a real-time moving-track that is in a moving event and of a first terminal in which the instant messaging client is located; generating, by the instant messaging client, a first track-sharing event in response to the track-sharing instruction; and sending, by the instant messaging client, the first track-sharing event to a server, where the first track-sharing event is used to instruct the server to share a real-time moving-track of the first terminal in a manner specified by the track-sharing instruction.

In the foregoing embodiments of the present invention, after the instant messaging client receives the sharing instruction to share the real-time moving-track of the first terminal in which the instant messaging client is located, the instant messaging client generates the first track-sharing event, and instructs, by using the first track-sharing event, the server (such as an instant messaging server) corresponding to the instant messaging client to share the real-time moving-track of the first terminal. According to the foregoing embodiment, the problem that a moving-track of a user cannot be shared in the existing technology may be resolved.

Optionally, in one embodiment, the storage medium may include but is not limited to various mediums that can store program code, for example, a USB disk, a read-only memory (ROM), a random-access memory (RAM), a mobile disk, a magnetic disk, and an optical disc.

When being implemented in a form of software functional unit and sold or used as independent products, the integrated units in the foregoing embodiments may be stored the foregoing computer-readable storage medium. The computer software product is stored in a storage medium, and includes several instructions used to make one or more computer devices (which may be a personal computer, a server, and a network device) perform all or some steps of the methods in the embodiments of the present invention.

In the several embodiments provided in this application, it should be understood that the disclosed client may be implemented in another manner. The apparatus embodiments described in the foregoing are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

Described in the foregoing are only preferable implementations of the present invention. It should be pointed out that, the person of ordinary skill in the art may further make several improvements and modifications without disobeying the principle of the present invention. These improvements and modifications should also fall within the protection scope of the present invention.

What is claimed is:
1. A moving-track sharing method, comprising:
displaying, on a real-time track page on a screen of a first terminal, a real-time moving-track and a real-time geographic location of the first terminal, the real-time moving track indicating a route that the first terminal has traveled since the first terminal invokes a positioning function to record a geographic location of the first terminal at each positioning moment;
receiving, by an instant messaging client executed on the first terminal, a track-sharing instruction initiated on the real-time track page;
obtaining, by the instant messaging client, a first moving-track generated in a first sharing time segment by the first terminal;
generating, by the instant messaging client, a first track-sharing event that carries at least the first moving-track in response to the track-sharing instruction, wherein the real-time moving-track comprises the first moving-track, the first moving-track indicating a route that the first terminal has traveled from a moment at which the first terminal invokes the positioning function to a moment at which the first terminal generates the first track-sharing event; and
sending, by the instant messaging client on the first terminal, the first track-sharing event to a server, wherein the first track-sharing event is used to instruct the server to share the real-time moving-track of the first terminal with a second terminal in a manner specified by the track-sharing instruction.

2. The method according to claim 1, after the sending, by the instant messaging client, the first track-sharing event to a server, the method further comprising:

sending, by the instant messaging client in real time, a second moving-track generated in the moving event by the first terminal to the server, wherein the real-time moving-track comprises the first moving-track and the second moving-track, and the second moving-track is a moving-track generated after the first moving-track.

3. The method according to claim 1, after the sending, by the instant messaging client, the first track-sharing event to a server, the method further comprising:

receiving, by the instant messaging client, a first track sharing request sent by the server; and sending, to the server, a third moving-track generated by the first terminal within a second sharing time segment indicated by the first track sharing request, wherein the real-time moving-track comprises the first moving-track and the third moving-track, the third moving-track indicating a route that the first terminal has traveled from the moment at which the first terminal generates the first track-sharing event to the moment at which the first terminal receives the first track sharing request.

4. The method according to claim 1, wherein a first account logs on to the instant messaging client on the first terminal, and the manner specified by the track-sharing instruction comprises:

sharing the real-time moving-track of the first terminal with one or more second accounts in an associated account list of the first account in the instant messaging client.

5. The method according to claim 4, wherein the receiving, by an instant messaging client, a track-sharing instruction comprises:

receiving, by the instant messaging client on the first terminal, a track-sharing instruction when the first account and the one or more second accounts are in a same messaging session.

6. The method according to claim 1, wherein a first account logs on to the instant messaging client on the first terminal, and the manner specified by the track-sharing instruction comprises:

notifying, by using the server corresponding to the instant messaging client, each account in an associated account list of the first account about a second track-sharing event, the second track-sharing event being used to share the real-time moving-track of the first terminal.

7. The method according to claim 1, after the receiving the track-sharing instruction by using the real-time track page, the method further comprises:

displaying, by the instant messaging client on the first terminal, a track sharing notification in a messaging session, the messaging session including a first account logged on to the first terminal and a second account logged on to the second terminal, wherein the track sharing notification carries a page link of the real-time track page of the first terminal; and displaying, by the first terminal, a real-time geographic location of the second terminal on the real-time track page of the first terminal after the second terminal operates the track sharing notification and enters the real-time track page by using the page link.

8. A moving-track sharing method, comprising:

receiving, by a server, a first track-sharing event sent by an instant messaging client on a first terminal, wherein the first track-sharing event carries a specified sharing manner and a real-time moving track of the first terminal, the real-time moving track indicating a route that the first terminal has traveled since the first terminal invokes a positioning function to record a geographic location of the first terminal at each positioning moment;

extracting, by the server from the first track-sharing event, a first moving-track generated within a first sharing time segment by the first terminal, wherein the real-time moving-track comprises the first moving-track indicating a route that the first terminal has traveled from a moment at which the first terminal invokes the positioning function to a moment at which the first terminal generates the first track-sharing event; and sharing in the specified sharing manner, by the server, the real-time moving-track of the first terminal comprising the first moving-track with one or more second terminals.

9. The method according to claim 8, wherein a first account logs on to the instant messaging client on the first terminal, and the sharing, by the server in the specified sharing manner, the real-time moving-track of the first terminal with the second terminal comprises:

sharing, by the server, the real-time moving-track of the first terminal with one or more second accounts in an associated account list of the first account, the one or more second accounts being logged on to the one or more second terminals; and notifying, by the server, each account in the associated account list of the first account about a second track-sharing event, the second track-sharing event being used to share the real-time moving-track of the first terminal.

10. The method according to claim 9, wherein the sharing, by the server, the real-time moving-track of the first terminal with the one or more second accounts in the associated account list of the first account in the instant messaging client comprises:

sharing, by the server, the real-time moving-track of the first terminal with the one or more second accounts that are in a same messaging session with the first account.

11. A non-transitory computer-readable storage medium containing computer-executable instructions for, when executed by one or more processors, performing a moving-track sharing method of an instant messaging client on a first terminal, the method, comprising:

displaying, on a real-time track page on a screen of the first terminal, a real-time moving-track and a real-time geographic location of the first terminal, the real-time moving track indicating a route that the first terminal has traveled since the first terminal invokes a positioning function to record a geographic location of the first terminal at each positioning moment;

receiving a track-sharing instruction initiated on the real-time track page;

obtaining a first moving-track generated in a first sharing time segment by the first terminal;

generating a first track-sharing event that carries at least the first moving-track in response to the track-sharing instruction, wherein the real-time moving-track comprises the first moving-track, the first moving-track indicating a route that the first terminal has traveled from a moment at which the first terminal invokes the positioning function to a moment at which the first terminal generates the first track-sharing event; and sending the first track-sharing event to a server, wherein the first track-sharing event is used to instruct the server to share the real-time moving-track of the first terminal with a second terminal in a manner specified by the track-sharing instruction.

12. The non-transitory computer-readable storage medium according to claim 11, after the sending the first track-sharing event to a server, the method further comprising:
   sending, by the instant messaging client in real time, a second moving-track generated in the moving event by the first terminal to the server, wherein the real-time moving-track comprises the first moving-track and the second moving-track, and the second moving-track is a moving-track generated after the first moving-track.

13. The non-transitory computer-readable storage medium according to claim 11, after the sending the first track-sharing event to a server, the method further comprising:
   receiving a first track sharing request sent by the server; and
   sending, to the server, a third moving-track generated by the first terminal within a second sharing time segment indicated by the first track sharing request, wherein the real-time moving-track comprises the first moving-track and the third moving-track, the third moving-track indicating a route that the first terminal has traveled from the moment at which the first terminal generates the first track-sharing event to the moment at which the first terminal receives the first track sharing request.

14. The non-transitory computer-readable storage medium according to claim 11, wherein a first account logs on to the instant messaging client on the first terminal, and the manner specified by the track-sharing instruction comprises:
   sharing the real-time moving-track of the first terminal with one or more second accounts in an associated account list of the first account in the instant messaging client.

15. The non-transitory computer-readable storage medium according to claim 14, wherein the receiving a track-sharing instruction comprises:
   receiving a track-sharing instruction when the first account and the one or more second accounts are in a same messaging session.

16. The method according to claim 1, wherein the real-time track page is an embedded page in the instant messaging client.

* * * * *